US007636362B2

(12) United States Patent
Singh et al.

(10) Patent No.: US 7,636,362 B2
(45) Date of Patent: Dec. 22, 2009

(54) SYSTEM AND METHOD OF DYNAMICALLY PROVIDING PRIORITY FOR NETWORK COMMUNICATIONS

(75) Inventors: Vebhhav Singh, Sunnyvale, CA (US); Veshaal Singh, Aligarh (IN); Nan Xie, San Mateo, CA (US)

(73) Assignee: Oracle International Corp., Redwood Shores, CA (US)

( * ) Notice: Subject to any disclaimer, the term of this patent is extended or adjusted under 35 U.S.C. 154(b) by 842 days.

(21) Appl. No.: 10/787,995

(22) Filed: Feb. 26, 2004

(65) Prior Publication Data

US 2005/0190755 A1 Sep. 1, 2005

(51) Int. Cl.
*H04L 12/28* (2006.01)

(52) U.S. Cl. ................................. 370/395.42

(58) Field of Classification Search ................. 370/389, 370/229, 412, 392, 395.21, 395.42; 709/228, 709/233, 226, 238, 250
See application file for complete search history.

(56) References Cited

U.S. PATENT DOCUMENTS

| 5,699,521 | A * | 12/1997 | Iizuka et al. ................. 709/240 |
| 6,141,686 | A | 10/2000 | Jackowski et al. |
| 6,223,201 | B1 | 4/2001 | Reznak |
| 6,286,052 | B1 * | 9/2001 | McCloghrie et al. ........ 709/238 |
| 6,643,260 | B1 | 11/2003 | Kloth et al. |
| 6,658,002 | B1 | 12/2003 | Ross et al. |
| 6,735,169 | B1 * | 5/2004 | Albert et al. ................. 370/229 |
| 6,795,860 | B1 | 9/2004 | Shah |
| 6,823,056 | B1 | 11/2004 | Hussain |
| 6,839,757 | B1 | 1/2005 | Romano et al. |
| 7,082,471 | B2 | 7/2006 | Hericourt |
| 7,086,064 | B1 | 8/2006 | Stevens |
| 7,120,442 | B2 | 10/2006 | Kim et al. |
| 7,216,160 | B2 | 5/2007 | Chintalapati et al. |
| 7,376,955 | B1 | 5/2008 | Forman |
| 2002/0002618 | A1 * | 1/2002 | Vange ........................ 709/228 |
| 2002/0064128 | A1 * | 5/2002 | Hughes et al. .............. 370/229 |
| 2003/0023661 | A1 | 1/2003 | Clohessy et al. |
| 2003/0061257 | A1 | 3/2003 | Cardona |
| 2004/0006602 | A1 | 1/2004 | Hess et al. |
| 2004/0226013 | A1 | 11/2004 | Mariotti et al. |
| 2007/0143449 | A1 | 6/2007 | Wray West et al. |

FOREIGN PATENT DOCUMENTS

JP  10232851 A  9/1998

OTHER PUBLICATIONS

USPTO Non-Final Office Action in co-pending U.S. Appl. No. 10/788,085, filed Feb. 26, 2004, having a mailing date of Aug. 27, 2008.
Notice of Allowance and Fee(s) Due and Notice of Allowability in co-pending U.S. Appl. No. 10/788,085, filed on Feb. 26, 2004 having a date mailed of Mar. 23, 2009.

* cited by examiner

*Primary Examiner*—Chirag G Shah
*Assistant Examiner*—Yong Zhou
(74) *Attorney, Agent, or Firm*—Kraguljac & Kalnay, L.L.C.

(57) ABSTRACT

Systems, methodologies, media, and other embodiments associated with prioritizing network traffic are described. One exemplary method embodiment includes receiving a notice from a computer component to prioritize network traffic associated with a selected service. Network communications are inspected to identify priority network traffic associated with the selected service. Priority settings can then be dynamically reconfigured in the priority network traffic.

23 Claims, 4 Drawing Sheets

SYSTEM AND METHOD OF DYNAMICALLY PROVIDING PRIORITY FOR NETWORK COMMUNICATIONS

CROSS REFERENCE TO RELATED APPLICATION

The present invention is related to the following commonly assigned U.S. Patent Application filed Feb. 26, 2004, entitled "System and Method For Identifying Network Communications of a Service," Ser. No. 10/788,085, inventors Singh et al., and is incorporated by reference herein in its entirety.

BACKGROUND

Software applications and application servers typically include many different services (e.g. configured as software modules or other forms) that can be invoked and executed. When a service is invoked, it may generate network calls such as a database call, an external application call, and other types of network communications that generate network traffic. In prior systems, the network communications coming from a selected application server could be given priority processing where the priority was given to the application server as a whole. However, providing priority or other special processing to a particular service within the application server was not performed. One reason is that network communications at a service-level could not be identified between different services of the same application server/software.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

A software application may include any number of services that are configured to perform a variety of functions. A service can be configured as one or more software modules, routines, or other types of software components that are configured to perform a desired function. One example service may be a purchase order generator that, as the name implies, generates purchase orders for a transaction. When the purchase order generator service is invoked and executed, it may generate a number of network calls that result in network communications (e.g. IP packets). The network calls can be, for example, a database call, a lightweight directory access protocol (LDAP) call, an external application call like a credit card validation, and so on. These types of network-oriented transactions generate network communications and network traffic.

In order to provide special processing for the purchase order generator service or other selected service, the network communications generated by or associated with the purchase order generator need to be identified. One type of special processing may include prioritizing the network communications so that they can be processed with priority over other network communications, even over other communications from the same software application. Once the network communications of a selected service can be distinguished from other network communications, the network communications can be identified and marked for priority at a hardware level. In one example, a device can be operably connected to a network and can reconfigure selected network traffic to receive priority processing.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a storage medium that participates in directly or indirectly providing stored signals, instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software stored in a computer-readable medium, and/or combinations of each to perform a function (s) or an action(s), and/or to cause a function or action from another logic, method, and/or system. For example, based on a desired application or needs, logic may include a software controlled microprocessor, discrete logic like an application specific integrated circuit (ASIC), a programmed logic device like a field programmable gate array (FPGA), a memory device containing instructions, combinations of logic devices, or the like. Logic may include one or more gates, combinations of gates, or other circuit components. Logic may also be fully embodied as software stared on a computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Figure 1:
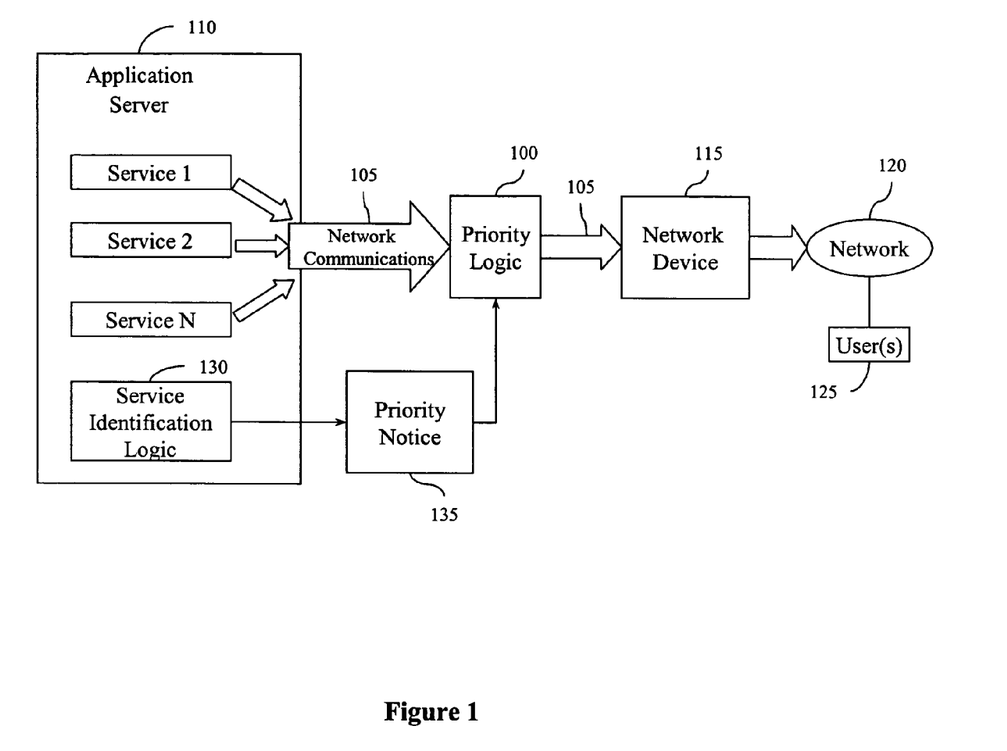
FIG. 1 illustrates an example system for prioritizing selected network traffic.

Illustrated in FIG. 1 is an example priority logic 100 that can facilitate identifying and reconfiguring network communications that travel along a communication channel. FIG. 1 also illustrates example logical and/or physical relationships between a variety of components. For example, the priority logic 100 can be configured to be operably connected in a communication channel 105 between a computer component like an application server 110 and one or more network devices 115. The application server 110 can, for example, process software applications on a computer system, and the network devices 115 can facilitate network communication to a network 120 like the Internet. It will be appreciated that the communication channel 105 can transmit communications in both directions between the application server 110 and the network 120 and may include a plurality of communication channels.

As one example, the application server 110 can be a server program in a computer or in a distributed network that provides business logic for a software application. A number of services 1-N may be available and/or invoked while the application server performs operations for and communicates with one or more users 125. Example services 1-N may include a purchase order generator, an inventory report generator, a data base query process, and/or other types of services that can be part of a software application/enterprise system.

Network calls made by a service can generate network traffic (e.g. data packets) that can be transmitted on the communication channel 105. The priority logic 100 can be configured to monitor and examine the data packets as they travel through the communication channel 105. When a data packet is identified as belonging to a priority service, the priority logic 100 can reconfigure one or more priority settings in the data packet before passing the data packet along to the network device 115. Other data packets can be passed along to the network device 115 without being reconfigured.

In one example using IP data packets, bits in a Type of Service (ToS) field can be modified in the data packet. The ToS field is also known as Differentiated Services Code Point (DSCP) and can be used to indicate particular Quality of Service (QoS) needs. For example, the ToS/DSCP field may represent the following bits in an IP packet header and can have the associated meanings that can affect the priority of a data packet:

Bits 8-10: Sets Precedence
Bit 11: minimum delay
Bit 12: maximize throughput
Bit 13: maximize reliability
Bit 14: minimize cost
Bit 15: reserved Thus, a data packet may be initially generated with a first set of values in the ToS/DSCP field but can be dynamically reconfigured (e.g re-prioritized) by the priority logic 100 to have a second set of values after the data packet is transmitted from its source (e.g. the application server 110). The ToS/DSCP settings may be acted upon by the network device(s) 115 in the data path to prioritize data flows. Examples network devices 115 may include routers, nodes, firewalls, bridges, traffic shapers, and so forth. The priority settings can be used to control data flow such as limiting the amount of bandwidth consumed by less-important traffic to make more bandwidth available for more-important traffic. For example, using the priority settings for a data packet, the network device 115 can apply, for example, predefined Quality of Service rules and/or requirements for processing the data packets based on the priority settings. In this manner, network communications can be dynamically prioritized for a selected service (e.g. at a service level) and a selected priority can be applied to selected data packets.

By configuring the priority logic 100 as a stand-alone, plug-in device, the re-prioritization of network traffic can be performed without having to modify existing priority rules and/or existing configurations of the network device 115. In one example, the priority logic 100 can be embodied as a hardware device that can reconfigure the priority of network communications at wire speed so as to cause a minimal delay in the network communications. The priority logic 100 can be an independent device that can be operably connected to the communication channel 105. As an independent device, existing network devices would not need to be replaced or require modification in order to add the features of the priority logic 100 to a network. The priority logic 100 can be a removable device that can be plugged into the network.

In another example, the priority logic 100 can be part of a network card that can be internal to a computer system where network communications from the application server 110 or other software applications pass through the network card. The priority logic 100 can also be an internal component of the network device 115 such as within a router, a network traffic shaper, and the like. Thus, it will be appreciated that a means for identifying and reconfiguring network traffic can include a stand-alone device, a network card, a computer, a router, a traffic shaper, a network node, and/or combinations of these.

To identify network communications that are associated with a selected service (e.g. service 1-N), the priority logic 100 can use identification data or other characteristics/parameters that can be provided by the application server 110 or other component from the same system. In one example, a service identification logic 130 can be provided in the computer system of the application server 110 that is configured to identify network communications that belong to a selected service. Various embodiments of the service identification logic 130 are described in co-pending U.S. Patent Application entitled "System and Method For Identifying Network Communications of a Service," identified previously, and that is incorporated by reference herein in its entirety.

In one example, the service identification logic 130 can identify at least a source IP address and source port value that is assigned for a particular communication session established for a selected service. Other identifiers can include the four components of an IP address like the source IP address, source port value, destination IP address, and destination port value. The source port value may be unique to each established communication channel (e.g. a socket) for a service and can be used to identify network communications belonging to that service. The service identification logic 130 can generate and transmit a signal/event to the priority logic 100 that alerts the priority logic 100 of soon-coming priority network traffic. The signal/event can be a priority notice 135 that identifies a selected service that is to receive priority and/or can provide the identification data for that service so that the appropriate network traffic is identified. With the identification data, the priority logic 100 will be able to distinguish network traffic associated The priority notice 135 can be transmitted prior to the actual network communications being transmitted from the selected service thereby allowing the priority logic 100 to prepare for monitoring of the communication channel 120. For example, if the priority notice 135 identified "service 1" as being a priority, the priority logic 100 would monitor for network traffic associated with "service 1." When a data packet is received by the priority logic 100, packet header information can be examined. If the header information includes characteristics that match the identified priority service, the priority logic 100 can dynamically reconfigure priority settings in the data packet so as to cause the data packet to be processed with a different priority than its originally assigned priority settings. It will be appreciated that the priority notice 135 can be received by the priority logic 100 via the communications channel 105.

Figure 2:
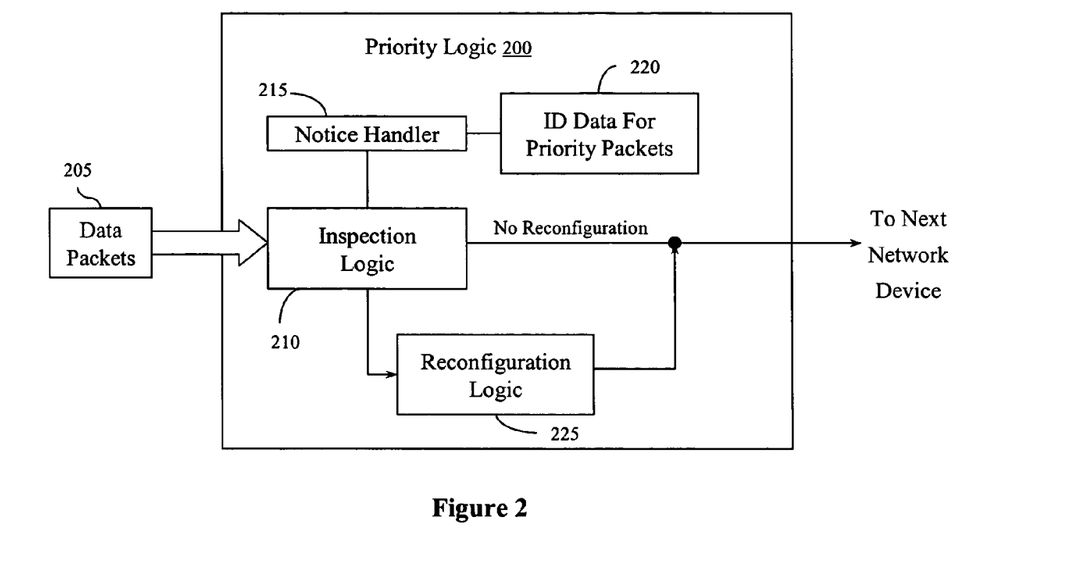
FIG. 2 illustrates an example component diagram of a priority logic.

Illustrated in FIG. 2 is one example of a priority logic 200 configured to identify data packets 205 and reconfigure the priority of selected packets. It will be appreciated that one or more components of the priority logic 200 can be implemented with logic such as an application specific integrated circuit (ASIC), programmable logic devices (e.g. FPGA), and/or other types of logic. The priority logic 200 can be embodied in various forms like a device that is connectable to a network channel using, for example, a network interface port (not shown).

The priority logic 200 may include an inspection logic 210 configured to receive the data packets 205 and inspect portions of their contents. A notice handler 215 can be logic that is configured to receive a notification event where the notification event includes identification data associated with network communications that are to be prioritized. If a data packet is a notification event like the priority notice 135 from FIG. 1, the notice handler 215 can facilitate reading the identification data and storing the data in a data store 220. The data store 220 can be configured to store the identification data that can be used by the inspection logic 210 to identify data packets that are to be dynamically prioritized. As described previously, the identification data includes data that can associate data packets to a priority service. It will be appreciated that one or more services can be identified as priority services. Thus, the data store 220 can store one or more sets of identification data. The identification data can include IP address data like a source port value assigned to a priority service, source IP address assigned to the priority service, and may include a class name of the priority service and the like.

As the data packets 205 are received by the priority logic 200, the inspection logic 210 can facilitate examining and identifying data packets that match the identification data 220 from a priority service. If a data packet is determined not to be associated to a priority service, then the inspection logic 210 does not reconfigure the data packet and passes it along to the next network device. If a data packet is determined to be associated to a priority service, a reconfiguration logic 225 can dynamically reconfigure priority settings in the data packet.

For example, in the IP header of a data packet, one or more bits from the Type of Service (ToS) field/Differentiated Services Code Point (DSCP) field can be changed before the data packet is transmitted out of the priority logic 200 to the next network device. Changing the ToS/DSCP field can cause a router or other network device to process the data packet with a different priority and/or can indicate a particular Quality of Service to be applied to the data packet. In this manner, a data packet can initially be created with a first priority setting and then be dynamically reconfigured with a second priority setting. This can be performed for data packets identified as being associated to a selected priority service from a software application or application server. In this manner, prioritization of network traffic can be performed at a service-level.

Figure 3:
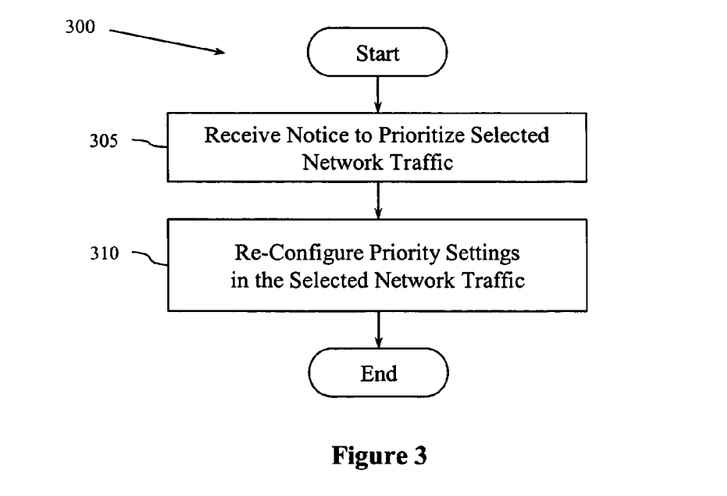
FIG. 3 illustrates an example methodology associated with reconfiguring priority settings of network traffic.
Figure 4:
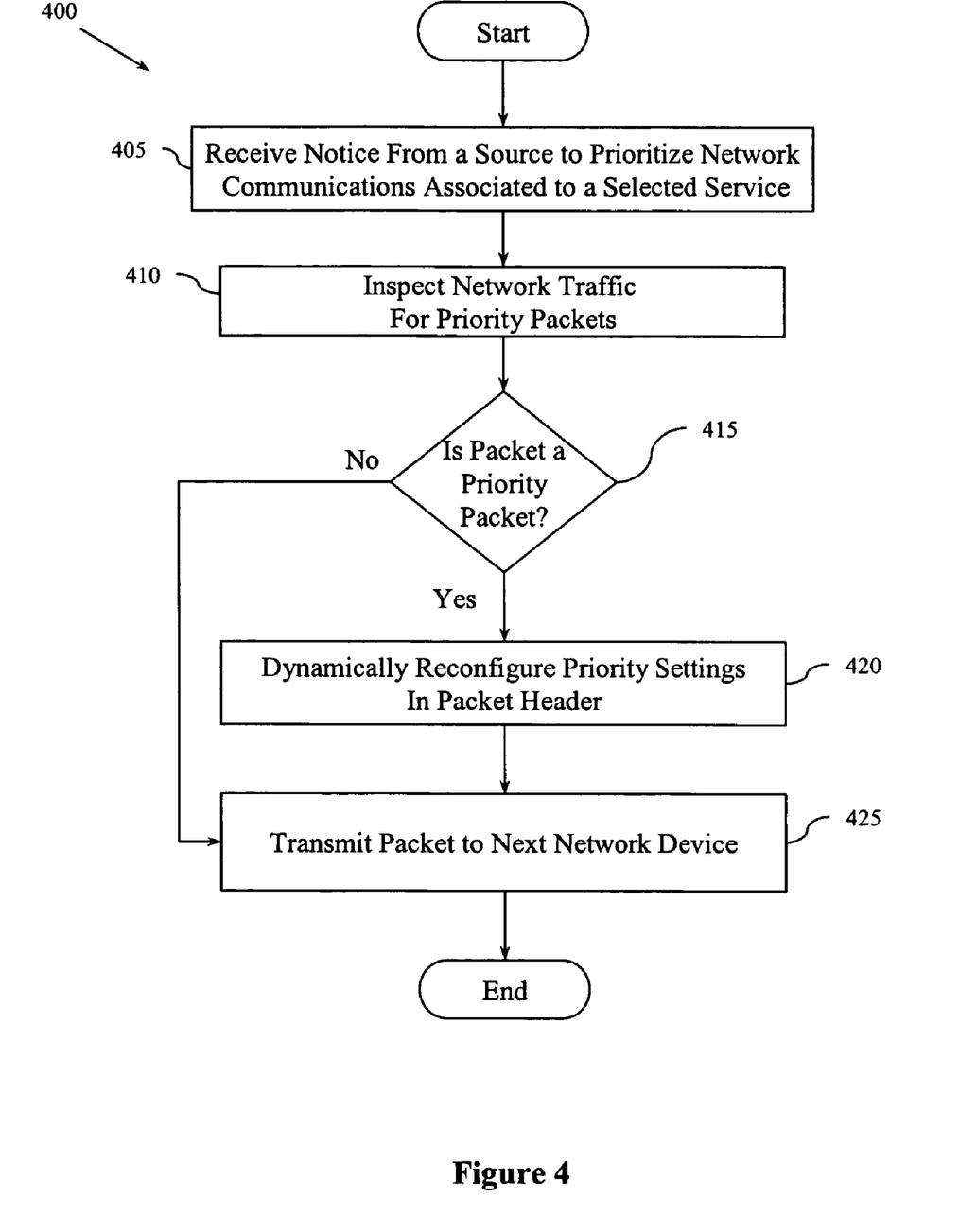
FIG. 4 illustrates another example methodology associated with prioritizing selected network traffic.

Example methods may be better appreciated with reference to the flow diagrams of FIGS. 3 and 4. While for purposes of simplicity of explanation, the illustrated methodologies are shown and described as a series of blocks, it is to be appreciated that the methodologies are not limited by the order of the blocks, as some blocks can occur in different orders and/or occur concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. In the case where the logic may be software, a flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software logic may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques. The foregoing applies to all methodologies herein.

Illustrated in FIG. 3 is an example methodology 300 associated with reconfiguring priority for network traffic such as data packets or other forms of network communications. In the example, it is presumed that a source computer component like an application server is providing one or more services that may be generating network traffic. The methodology 300 can be applied at a desired point along the communication path of the network traffic. Once the source component can identify a selected priority service, a notice can be transmitted that serves as instructions to prioritize the network traffic associated with the priority service.

The methodology 300 begins at block 305 when a notice is received to prioritize selected network traffic (e.g. selected data packets or other form of network communications). The notice can include identification data that assists the process to identify the network traffic to be prioritized. Network traffic can be monitored for data packets that have been indicated as being a priority. When a priority data packet is found, priority settings in the selected data packet are reconfigured to cause the selected data packet to receive priority processing (block 310). Thus, at a point along the data path of a data packet, the data packet may be identified as priority network traffic and have its priority settings changed. The process may occur, for example, before the network traffic reaches a network device like a router that processes the network traffic and applies priority rules.

Optionally, an acknowledgment step can be included after the notice is received at block 305. For example, once the notice is received, an acknowledgment signal can be transmitted back to the source component. Concurrently, the source component may be configured to hold the transmission of the network traffic until an acknowledgment is returned. The acknowledgment signal can signify that the process is ready to monitor the data path and ensure that network traffic from the selected priority service is not missed.

FIG. 4 illustrates another example methodology 400 associated with reconfiguring priority settings for network traffic associated to a selected service. The methodology 400 may be initiated by receiving a notice from a source to prioritize network communications associated to a selected service (block 405). The source may be a computer component that is associated with the selected service, which is being executed, and that can provide identification data related to the executing service. The identification data can be used to identify network traffic generated by and/or caused to be generated by the selected service. One or more notices may be received that can represent one or more services that should receive priority processing of their network traffic.

In response to receiving one or more notices, the identification data from each notice can be stored and used to inspect network traffic. Additionally, an acknowledgement signal can be returned in response to receiving a notice. In response to network traffic being received, the network traffic is inspected to identify priority traffic (e.g. priority data packets) (block 410). In one example, the identification data includes a source IP address and/or a source port value assigned to a socket that is processing network communications for a service. By comparing the source port value and/or other parameters from a data packet header to the identification data of priority services, the process can determine whether the data packet is a priority packet (block 415). If the data packet is not a priority packet, no change is made and the data packet is transmitted to the next network device for further processing (block 425).

If the data packet is a priority packet at block 415, its header can be dynamically reconfigured to change priority settings (block 420) and then transmitted to the next network device to continue its transmission (block 425). For example, if a packet header includes a ToS or DSCP field as used in TCP/IP communications, the ToS/DSCP field can be changed to set a higher priority for the data packet. Of course, other types of communication protocols may use different fields that serve to identify the priority settings or requirements for a network communication and the present methodology can be easily modified to operate with other protocols.

As a priority service generates network traffic, the network traffic can include numerous IP data packets. Each data packet will include the same source IP address and source port value that can be used to identify the data packet as belonging to the priority service. As each data packet is identified along its communication path, the data packet can be reconfigured with a different priority (e.g. a higher priority) than the data packet originally had. Performing this process at a hardware level (e.g. at line speed) can reduce the overhead associated with inspecting and reconfiguring the data packets.

While the figures illustrate various actions occurring in serial, it is to be appreciated that various actions could occur substantially in parallel, can occur in different orders, and/or can occur at different points in time. Furthermore, while a certain number of processing blocks (e.g. processes) are described in each figure, it is to be appreciated that a greater and/or lesser number of processes could be employed.

In one example, the methodologies are implemented as processor executable instructions and/or operations that can be provided by a computer-readable medium. Thus, in one example, a computer-readable medium may store and/or provide processor executable instructions operable to perform one or more of the described methods. The instructions can also be loadable into firmware of a logic device and can control one or more operations of the logic device. Thus, the instructions can be device executable instructions. In another example, a logic device may be configured to perform the illustrated methodologies and/or similar methodologies.

Figure 5:
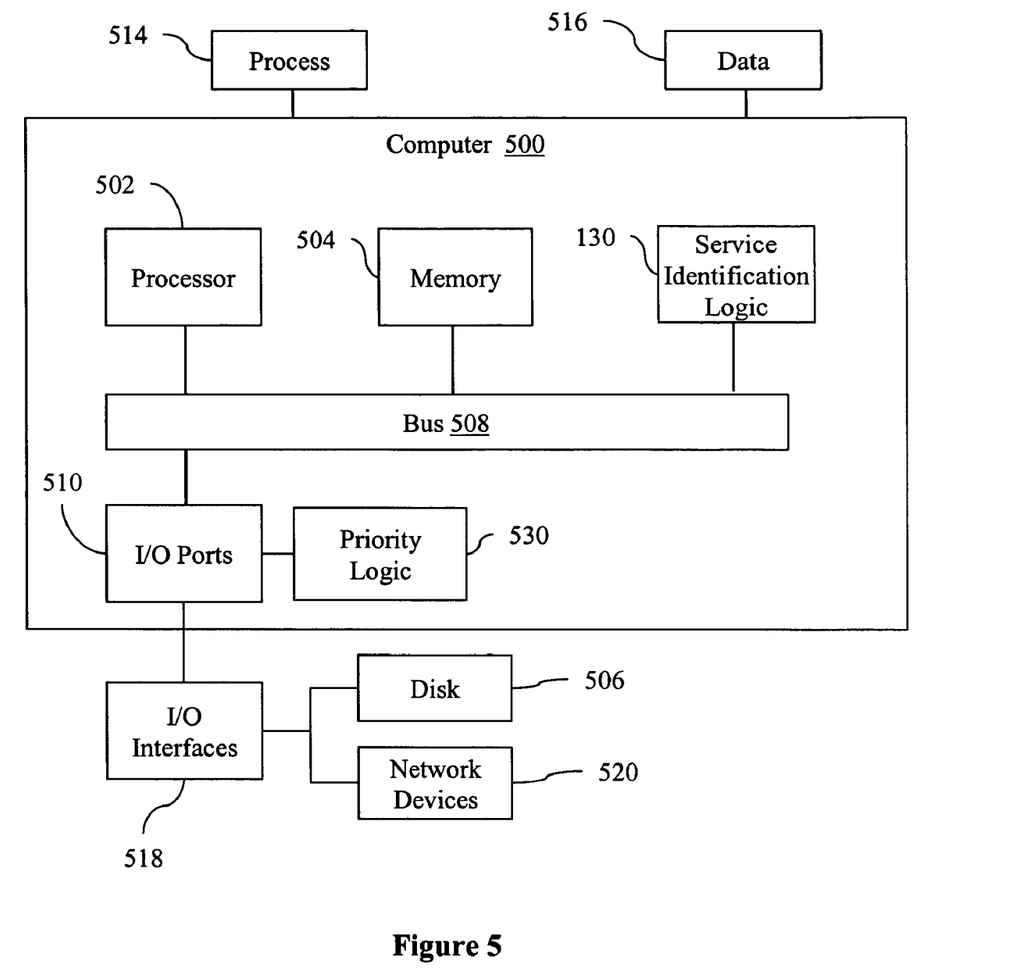
FIG. 5 illustrates an example computing environment in which example systems and methods illustrated herein can operate.

FIG. 5 illustrates an example computer system 500 that includes a processor 502, a memory 504, and input/output ports 510 operably connected by a bus 508. In one example, the computer 500 may include a priority logic 530 configured to facilitate identifying priority network communications and reconfiguring the priority network communications with different priority settings as previously described. For example, the priority logic 530 can be configured similar to the priority logics described in FIGS. 1, 2 and/or with systems and methods of FIGS. 3-4.

In one example, the priority logic 530 can be operably connected to input/output ports 510 so as to be in a network communication channel. Being in the communication channel allows the priority logic 530 to inspect network traffic that is generated from an executing process, or other computer component. The priority logic 530 can then determine whether to reconfigure the priority settings in the network traffic before the network traffic is transmitted out of the computer 500. The computer 500 can also include the service identification logic 130 as described with reference in FIG. 1. The service identification logic 130 can transmit notification signals to the priority logic 530 that allow the priority logic 130 to identify priority network traffic.

Generally describing an example configuration of the computer 500, the processor 502 can be a variety of various processors including dual microprocessor and other multi-processor architectures. The memory 504 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can include, but is not limited to, devices like a magnetic disk drive, a solid state disk drive, a floppy disk drive, a tape drive, a Zip drive, a flash memory card, and/or a memory stick. Furthermore, the disk 506 can include optical drives like a CD-ROM, a CD recordable drive (CD-R drive), a CD rewriteable drive (CD-RW drive), and/or a digital video ROM drive (DVD ROM). The memory 504 can store processes 514 and/or data 516, for example. The disk 506 and/or memory 504 can store an operating system that controls and allocates resources of the computer 500.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via I/O interfaces 518 and input/output ports 510. Input/output devices can include, but are not limited to, a keyboard, a microphone, a pointing and selection device, cameras, video cards, displays, disk 506, network devices 520, and the like. The input/output ports 510 can include but are not limited to, serial ports, parallel ports, and USB ports.

The computer 500 can operate in a network environment and thus may be connected to network devices 520 via the I/O devices/interfaces 518, and/or the I/O ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 520 can connect to WAN technologies including, but not limited to, point to point links, circuit switching networks like integrated services digital networks (ISDN), packet switching networks, and digital subscriber lines (DSL).

With the above described systems and methods, selected network traffic can be dynamically reconfigured along its network data path to receive a different priority. By receiving information regarding priority network traffic from the application-side, a hardware device downstream in the network data path can distinguish the priority network traffic from other traffic and mark the traffic for priority. Thus, a dynamic Quality of Service (QoS) solution can be applied/retrofitted onto an existing network architecture.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system comprising:
    an application server for executing an application that invokes a plurality of services;
    service identification logic to identify network communications from a selected service from the plurality of services by:
        identifying a communication socket established for the selected service; and
        identifying at least a source port value assigned to the communication socket;
    a priority logic configured in a communication channel between the application server and a network device where network communications to and from the application server are processed by at least the network device, the priority logic comprising:
        a notice handler configured to receive a notification event from the application server where the notification event includes identification data comprising the source port value assigned to the communication socket for the selected service, where the identification data designates values associated with network communications from the selected service that are to be prioritized;
        inspection logic configured to identify network communications that are associated with the selected service in the communication channel that match the identification data by at least matching the source port value to a port value in the network communications; and
        reconfiguration logic configured to dynamically reconfigure priority settings in the network communications that are identified.

2. The system of claim 1 where the network communications are embodied as data packets, and where the inspection logic is configured to:
    examine header information from a received data packet; and
    if the header information includes a match with the identification data, the reconfiguration logic being configured to reconfigure the priority settings in the header information.

3. The system of claim 2 where the priority settings include one or more bits associated with a Type of Service (ToS) field or a Differentiated Services Code Point (DSCP) field.

4. The system of claim 1 where the reconfiguration logic is configured to cause the network device to process the network communications with a different priority after reconfiguring the priority settings of the network communications.

5. The system of claim 1 where the identification data includes data that identifies network communications associated with the application server at a service-level to differentiate between different services processed by the application server.

6. The system of claim 1 where the priority logic is embodied in a network card configured to be operably connected to a computer system.

7. The system of claim 1 where the system is a computer system.

8. The system of claim 1 where the priority logic is embodied as an independent device configured to be in communication between the application server and the network device.

9. The system of claim 1 where the system includes the network device and where the system and the network device are configured to process network data packets.

10. The system of claim 9 where the network device includes at least one of, a router, a network traffic shaper, or a node.

11. The system of claim 9 where the priority logic system is embodied within the network device.

12. A system, comprising:
    an application server including at least one processor configured to process software including one or more services;
    a service identification logic configured to monitor the software being processed and to identify a priority service being processed, where the service identification logic functions to identify a socket opened for the priority service and retrieves a source port value assigned to the socket opened;
    the service identification logic being further configured to transmit a priority notice to a priority logic, the priority notice including identification data comprising the source sort value assigned to the socket opened that identifies network traffic associated with the priority service;
    a priority logic configured to inspect network communications being transmitted from the application server and to identify network traffic associated with the priority service using the identification data based at least in part on the source port value, the priority logic further being configured to reconfigure priority settings within the identified network traffic; and
    a network device operably connected to the priority logic, the network device being configured to process network communications from the application server and to process the identified network traffic using the reconfigured priority settings.

13. The system of claim 12 where the priority logic is internal to the network device;
    the network device including a memory to store the identification data from the priority notice that is separately received from the network traffic; and the priority logic identifies the network traffic associated with the priority service by comparing the stored identification data to data within the network traffic.

14. The system of claim 12 where the priority logic is operably connected in a communication channel between the application server and the network device.

15. The system of claim 12 where the network communications include data packets, and the priority logic is configured to reconfigure the priority settings associated with header information of a data packet.

16. The system of claim 12 where the network device includes at least one of: a router, a traffic shaper or a network node.

17. A method of prioritizing network traffic at a service-level, the method comprising the steps of:
   monitoring for a socket opened for a selected service, where the selected service is invoked as part of an executing application, and where at least a portion of the monitoring is performed by a processor;
   identifying, by at least the processor, a source port value assigned to the socket opened;
   generating, by at least the processor, identification data including at least the source port value that is associated with the selected service that is to receive priority processing;
   inspecting network communications to identify network data that is associated with the selected service using the identification data by matching a source port value from the network data to the source port value from the identification data; and
   in response to a network data being matched with the source port value, dynamically reconfiguring priority settings in the network data to cause the network data to be processed with a different priority by a network device.

18. The method of claim 17 where the identification data further includes at least an IP address associated with network communications generated by the selected service.

19. The method of claim 17 where the reconfiguring priority settings step includes changing one or more bits in data packet headers.

20. The method of claim 19 where the one or more bits are within one of a Type of Service field or a Differentiated Services Code Point field.

21. The method of claim 17 where the identification data is generated in a priority notice, the priority notice being generated prior to the network data from the selected service being transmitted.

22. A computer-readable medium storing executable instructions that when executed by a processor perform a method, the method comprising:
   monitoring for a socket opened for a selected service, where the selected service is invoked as part of an executing application;
   retrieving a source port value assigned to the socket opened;
   generating identification data including at least the source port value that is associated with the selected service that is to receive priority processing;
   inspecting network communications to identify network data that is associated with the selected service using the identification data by matching a source port value from the network data to the source port value from the identification data; and
   in response to a network data being matched with the source port value, dynamically reconfiguring priority settings in the network data to cause the network data to be processed with a different priority by a network device.

23. A computer system comprising:
   a processor for at least executing instructions for monitoring for a socket opened for a selected service, where the selected service is invoked as part of an executing application;
   means for retrieving a source port value assigned to the socket opened;
   means for generating identification data including at least the source port value that is associated with the selected service that is to receive priority processing;
   means for inspecting network communications to identify network data that is associated with the selected service using the identification data by matching a source port value from the network data to the source port value from the identification data; and
   means for dynamically reconfiguring priority settings in the network data to cause the network data to be processed with a different priority by a network device, where the reconfiguring is in response to a network data being matched with the source port value.

* * * * *

UNITED STATES PATENT AND TRADEMARK OFFICE
CERTIFICATE OF CORRECTION

PATENT NO. : 7,636,362 B2
APPLICATION NO. : 10/787995
DATED : December 22, 2009
INVENTOR(S) : Vebhhav Singh et al.

It is certified that error appears in the above-identified patent and that said Letters Patent is hereby corrected as shown below:

In column 3, line 56, delete "servelet," and insert -- servlet, --, therefor.

In column 5, line 29, delete "(e.g" and insert -- (e.g. --, therefor.

In column 6, line 34, after "associated" insert -- . --.

In column 12, line 32, in claim 11, delete "logic system" and insert -- logic --, therefor.

In column 12, line 47, in claim 12, delete "sort" and insert -- port --, therefor.

In column 13, line 13, in claim 16, delete "shaper" and insert -- shaper, --, therefor.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,636,362 B2  Page 1 of 1
APPLICATION NO. : 10/787995
DATED : December 22, 2009
INVENTOR(S) : Singh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1481 days.

Signed and Sealed this

Ninth Day of November, 2010

David J. Kappos
*Director of the United States Patent and Trademark Office*